United States Patent
Saito

(10) Patent No.: US 8,880,252 B2
(45) Date of Patent: Nov. 4, 2014

(54) ELECTRICITY STORAGE CONTROL DEVICE FOR HYBRID VEHICLE

(75) Inventor: Jun Saito, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/151,982

(22) Filed: Jun. 2, 2011

(65) Prior Publication Data

US 2011/0301799 A1 Dec. 8, 2011

(30) Foreign Application Priority Data

Jun. 3, 2010 (JP) .................................. 2010-127846

(51) Int. Cl.
| | | |
|---|---|---|
| B60W 40/00 | (2006.01) | |
| B60L 11/00 | (2006.01) | |
| B60L 11/18 | (2006.01) | |
| B60L 11/12 | (2006.01) | |
| B60L 15/20 | (2006.01) | |

(52) U.S. Cl.
CPC ............ B60L 11/123 (2013.01); *Y02T 10/7077* (2013.01); *Y02T 10/705* (2013.01); *Y02T 10/7005* (2013.01); B60L 11/1861 (2013.01); *Y02T 10/7044* (2013.01); *Y02T 10/6217* (2013.01); *Y02T 10/7283* (2013.01); B60L 15/2045 (2013.01)
USPC .......................... 701/22; 340/438; 180/65.285

(58) Field of Classification Search
None
See application file for complete search history.

(56) References Cited

U.S. PATENT DOCUMENTS

2007/0029121 A1  2/2007  Saitou et al.
2009/0021385 A1*  1/2009  Kelty et al. .................... 340/660
(Continued)

FOREIGN PATENT DOCUMENTS

| CN | 101542095 A | | 9/2009 |
|---|---|---|---|
| JP | 2003023703 A | * | 1/2003 |

(Continued)

OTHER PUBLICATIONS

Japanese Office Action issued in Japanese Patent Application No. 2010-127846 on Apr. 22, 2013.

(Continued)

*Primary Examiner* — Behrang Badii
*Assistant Examiner* — Demetra Smith-Stewart
(74) *Attorney, Agent, or Firm* — Birch, Stewart, Kolasch & Birch, LLP

(57) ABSTRACT

An electricity storage control device for a hybrid vehicle that includes: an internal combustion engine; a battery that is charged by a power generator driven by the internal combustion engine; and a motor that is driven upon receiving an electric power from the battery, the hybrid vehicle conducting travel in an EV mode for traveling with only the motor, includes: a planned traveling distance setting unit that sets a planned traveling distance in the EV mode; and a residual control unit that calculates a traveling enable distance in the EV mode according to an electricity storage state of the battery and that, when the planned traveling distance is longer than the traveling enable distance, operates the internal combustion engine to cause the power generator to charge the battery so that amount of storage in the battery reaches amount of storage corresponding to the planned traveling distance.

5 Claims, 3 Drawing Sheets

(56) References Cited

U.S. PATENT DOCUMENTS

| | | | |
|---|---|---|---|
| 2009/0139781 A1* | 6/2009 | Straubel | 180/65.1 |
| 2009/0277701 A1* | 11/2009 | Soma et al. | 180/65.25 |
| 2010/0006359 A1* | 1/2010 | Ang et al. | 180/65.285 |
| 2010/0049389 A1* | 2/2010 | Ando | 701/22 |
| 2010/0087973 A1 | 4/2010 | Kaita et al. | |
| 2010/0185349 A1* | 7/2010 | Harada et al. | 701/22 |
| 2010/0204863 A1* | 8/2010 | Sakamoto et al. | 701/22 |
| 2010/0265050 A1* | 10/2010 | Skaff et al. | 340/438 |
| 2010/0324765 A1* | 12/2010 | Iida et al. | 701/22 |
| 2011/0037582 A1* | 2/2011 | Wu | 340/438 |
| 2011/0166732 A1* | 7/2011 | Yu et al. | 701/22 |
| 2011/0202210 A1* | 8/2011 | Goda | 701/22 |
| 2011/0241859 A1* | 10/2011 | Handa | 340/438 |
| 2011/0246061 A1* | 10/2011 | Hayashi | 701/201 |
| 2012/0042716 A1* | 2/2012 | Watson et al. | 73/114.54 |
| 2012/0116620 A1* | 5/2012 | Wang et al. | 701/22 |
| 2013/0131900 A1* | 5/2013 | Yu et al. | 701/22 |

FOREIGN PATENT DOCUMENTS

| | | | |
|---|---|---|---|
| JP | 2003333705 A | * | 11/2003 |
| JP | 2008137543 A | * | 6/2008 |
| JP | 2009-248822 A | | 10/2009 |
| JP | 2009248822 A | * | 10/2009 |
| JP | 2011038845 | * | 2/2011 |
| WO | 2005/068245 A1 | | 7/2005 |

OTHER PUBLICATIONS

Chinese Office Action issued in Chinese Patent Application No. 201110158246.8 on Jul. 31, 2013.

Japanese Office Action issued in Japanese Patent Application No. 2010-127846 on Jun. 27, 2013.

Chinese Office Action was issued in Chinese Application No. 201110158246.8 on Feb. 18, 2014.

* cited by examiner

ELECTRICITY STORAGE CONTROL DEVICE FOR HYBRID VEHICLE

BACKGROUND OF THE INVENTION

1. Field of the Invention

The present invention relates to an electricity storage control device for a hybrid vehicle, which can perform travel with the use of only a motor by an electric power of a battery.

2. Description of the Related Art

There are related-art hybrid vehicles that travel while keeping a constant SOC (the amount of storage) of an on-vehicle battery under control. Under the control, the related-art hybrid vehicles travel in an EV mode (EV travel) using only the motor as a power source with an electric power stored in a battery, or achieve a travel distance in the EV travel with the battery nearly fully charged by an external power supply as in a plug-in system.

In the above EV travel of the hybrid vehicle, because the hybrid vehicles travel with only the motor (no engine operates), an operation sound is small, and a person is free from noise. For that reason, the EV travel is significantly effective when the vehicle travels in a residential area or around town in the middle of the night.

Under the circumstances, related-art hybrid vehicle having an EV switch in which when a vehicle occupant operates the EV switch to select the EV travel, only the EV travel is conducted have come on the market.

However, in the EV travel of the related-art hybrid vehicle, because an electric power of the battery is used up to a lower limit constant SOC under control, an electric energy remaining in the battery during or after travel are diverse. In a situation where the vehicle occupant desires the EV travel, for example, when the vehicle enters a residential area close to home, which is a destination, in the middle of the night, or when the vehicle put into a garage the previous day leaves the residential area early in the morning, the battery does not frequently ensure sufficient SOC for allowing the vehicle to travel in the residential area. For that reason, there are many cases in which the EV travel cannot be conducted when it is desired that the vehicle travels silently.

In particular, in the related-art hybrid vehicle, since the SOC of the battery is merely indicated by an indicator as the remaining electric energy (the amount of storage) of the battery, the vehicle occupant cannot understand from the indication by the indicator how long the hybrid vehicle can really conduct the EV travel, and cannot frequently keep the EV travel on the way even if the EV travel of the hybrid vehicle is executed, which makes it difficult to continue silent travel intended by the vehicle occupant.

In the related-art hybrid vehicle, as disclosed in JP-A-2009-248822, in order to get a distance of the EV travel executed with the help of the battery, the amount of charge in the battery is increased according to a target travel distance.

However, JP-A-2009-248822 fails to teach that a desired travel distance of the EV travel is ensured with the electric power remaining in the battery. For that reason, the hybrid vehicle cannot sufficiently utilize the EV travel.

SUMMARY OF THE INVENTION

It is therefore an object of the invention to provide an electricity storage control device for a hybrid vehicle, which can travel a planned traveling distance of the desired EV travel even under any circumstances.

In order to achieve the object, according to the invention, there is provided an electricity storage control device for a hybrid vehicle, the hybrid vehicle comprising: an internal combustion engine; a battery that is charged by a power generator driven by the internal combustion engine; and a motor that is driven upon receiving an electric power from the battery, the hybrid vehicle conducting travel in an EV mode for traveling with only the motor, the electricity storage control device comprising: a planned traveling distance setting unit that sets a planned traveling distance in the EV mode; and a residual control unit that calculates a traveling enable distance in the EV mode according to an electricity storage state of the battery and that, when the planned traveling distance is longer than the traveling enable distance, operates the internal combustion engine to cause the power generator to charge the battery so that amount of storage in the battery reaches amount of storage corresponding to the planned traveling distance.

DETAILED DESCRIPTION OF THE INVENTION

Hereinafter, an embodiment of the present invention will be described with reference to FIGS. 1A to 3.

Figure 1A:
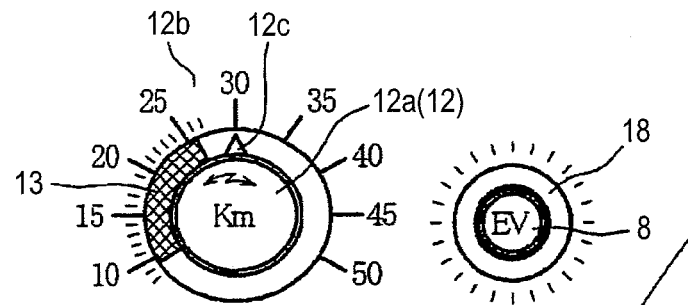
FIGS. 1A and 1B are schematic diagrams illustrating a configuration of a hybrid vehicle according to an embodiment of the present invention.
Figure 1B:
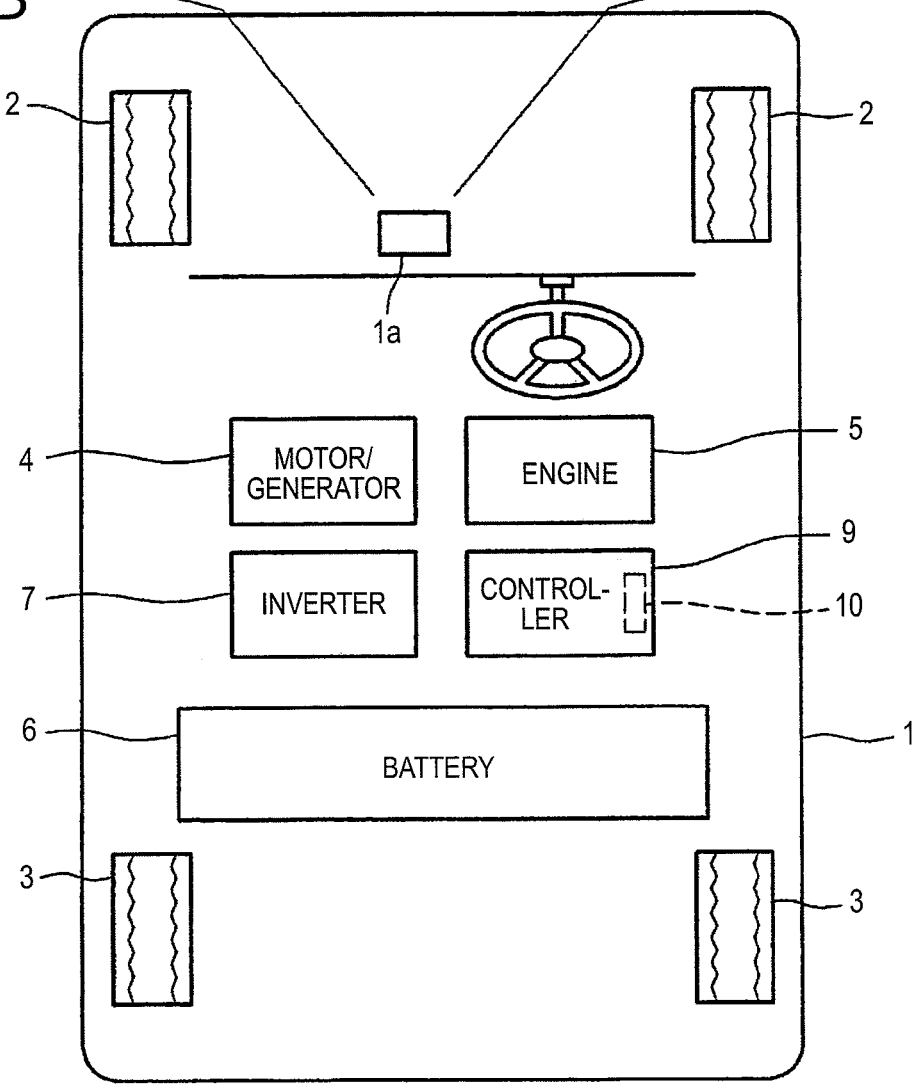

FIG. 1B illustrates a schematic configuration diagram of a hybrid vehicle. A configuration of the vehicle will be described with reference to FIG. 1B. A vehicle body 1 includes steered wheels 2 and driving wheels 3. In the vehicle body 1 are mounted a motor/generator 4 (a motor and a generator) that drives the driving wheels 3, an engine 5 that drives the driving wheels 3 and drives (generates an electric power) the motor/generator 4, a chargeable and dischargeable battery 6, an inverter 7, and a controller 9. The motor/generator 4 may not be a device having a motor function integrated with a generator function, but may be of a structure in which the motor and the generator are separated from each other.

The battery 6 is connected to the motor/generator 4 through the inverter 7, and an electric power is transferred between the battery 6 and the motor/generator 4. With this configuration, the electric power stored in the battery 6 is used to operate the motor/generator 4. Also, the engine 5 is connected to the driving wheels 3 through the motor/generator 4 and a clutch (not shown) so as to enable the driving (power generation) of the motor/generator 4 and the driving of the driving wheels 3. That is, the hybrid vehicle enables the travel in the EV mode in which only the motor/generator 4 driven by the electric power supplied from the battery 6 (electric power stored in the battery 6) is used for traveling, and the travel in the HV mode mainly using the engine 5 in which the motor/generator 4 is driven (power generated) by the engine 5 to charge the battery 6, or an engine output is transmitted to the driving wheels 3.

The controller 9 controls the EV travel and the HV travel. More specifically, the controller 9 controls the actuation (motor) of the motor/generator 4 and the driving (power generation) of the motor/generator 4 according to the travel state so as to keep the constant lower limit SOC (storage capacity) of the battery 6. Further, the controller 9 drives the driving wheels 3 by the engine output only in the high-load travel state. Also, the controller 9 is connected to an EV switch 8, for example, disposed on an instrument panel 1a in front of a driver's seat, and forcedly switches the mode to the EV mode upon operating the EV switch 8 so as to select only the EV mode (EV travel select).

Figure 2:
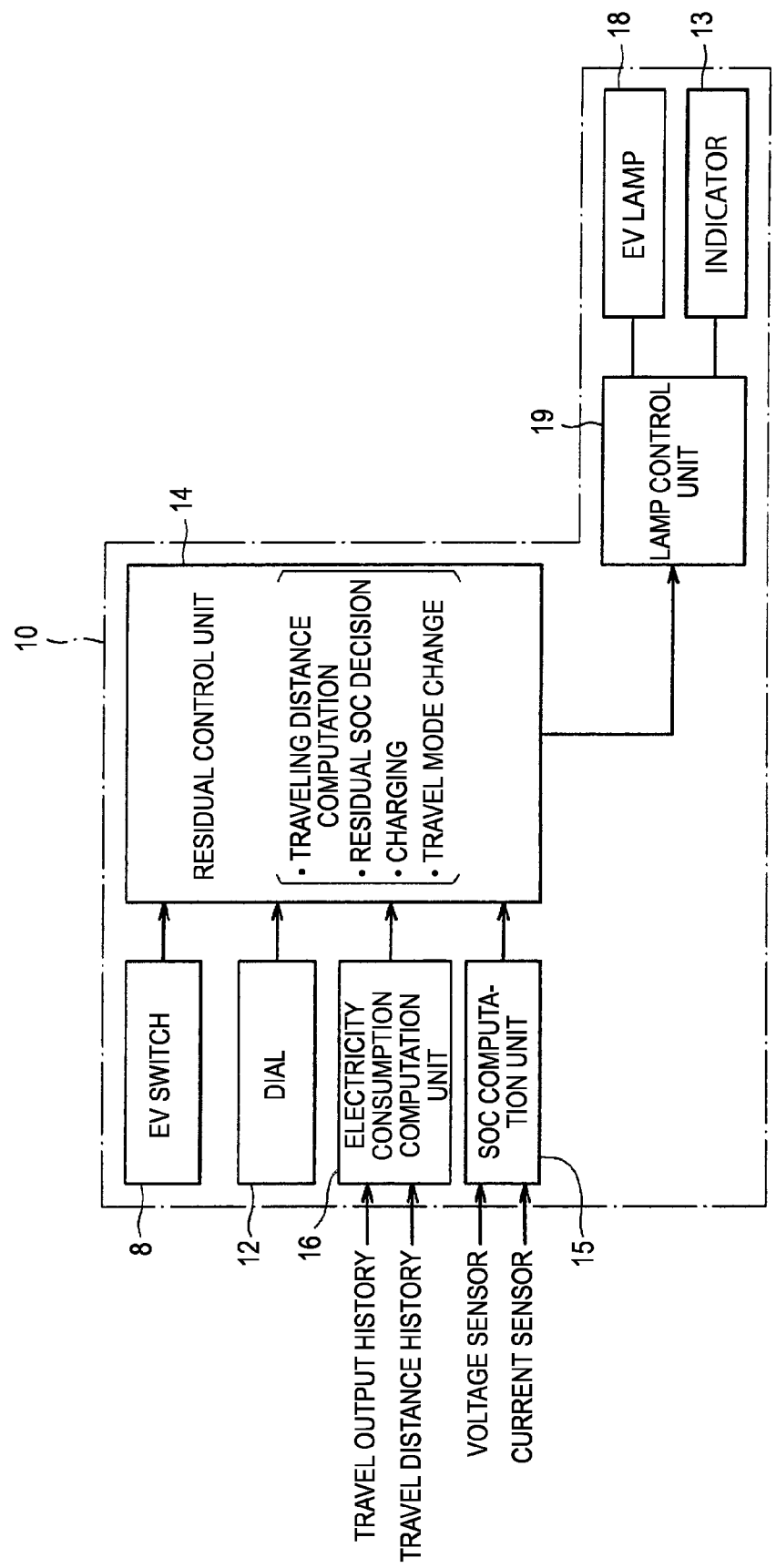
FIG. 2 is a block diagram schematically illustrating a configuration of an electricity storage control device for the hybrid vehicle.

The hybrid vehicle thus configured is equipped with an electricity storage control device 10. The electricity storage control device 10 is stored, for example, in a part of the controller 9. A configuration of the electricity storage control device 10 is illustrated in FIG. 2.

The electricity storage control device 10 is a device functioning as an auxiliary fuel tank in which only the amount of storage for travelling the planned traveling distance of the desired EV travel remains in the battery 6 to the last. The electricity storage control device 10 includes a dial 12 for setting the planned traveling distance of the desired EV travel, and a residual control unit 14 that enables the EV travel and the HV travel while the amount of storage for traveling the set planned traveling distance remains in the battery 6.

More specifically, the dial 12 is structured so that a dial member 12a is disposed on the instrument panel 1a in front of the driver's seat, for example, as illustrated in FIG. 1A. A scale 12b (for example, 10 to 50 km) indicative of the planned traveling distance is disposed around the dial member 12a. When a pointer 12c of the dial member 12a is adjusted to a desired scale portion, the planned traveling distance is set. Also, an indicator, for example, an indicator 13 of the display system for lighting up segments is disposed along the scale 12b between the dial member 12a and the scale 12b.

The residual control unit 14 includes: a function of reading the SOC of the existing battery 6 from an SOC computation unit 15 that detects an electricity storage state of the battery 6; a function of calculating a traveling enable distance A of the EV travel with the use of the SOC; a function of comparing the traveling enable distance A with a planned traveling distance B set by the dial member 12a; a travel mode changing function of changing the mode to the EV mode or the HV mode in which the SOC for enabling the EV travel of the planned traveling distance B is allowed to remain, and the constant SOC is kept, when the planned traveling distance B is shorter than the traveling enable distance A; and a function of charging the battery 6 for recovering the battery 6 up to the amount of storage corresponding to the planned traveling distance B, when the planned traveling distance B exceeds (is longer than) the traveling enable distance A. As a result, the SOC required for conducting the EV travel of the planned traveling distance B in the EV mode is allowed to remain in the battery 6 to the last. That is, the auxiliary fuel tank function that enables the EV travel of an arbitrary distance is provided. In particular, an input side of the residual control unit 14 is connected with an electricity consumption computation unit 16 that calculates an electricity consumption which is a unit electric energy consumed per unit travel distance of the vehicle on the basis of a history of the past travel distance of the EV travel. The planned traveling distance for enabling the EV travel is devised to be calculated as accurately as possible on the basis of the history of the past travel output and travel distance of the EV travel. Also, the EV switch 8 is made effective by the residual control unit 14 when the SOC is ensured.

The EV switch 8 disposed close to the dial 12 is equipped with an EV lamp 18 that is an annunciation unit. In this example, the EV lamp 18 is configured by, for example, arranging a light source annularly around the EV switch 8. The EV lamp 18 is connected to the indicator 13 and the residual control unit 14 through a lamp control unit 19. The light source of the lamp control unit 19 is set to turn on (light up) when the amount of storage in the battery 6 that satisfies the planned traveling distance, that is, the SOC is ensured, under the control of the lamp control unit 19. That is, the lighting of the EV lamp 18 notifies the vehicle occupant that the EV travel of the planned traveling distance is enabled, that is, effective.

The indicator 13 is set to light up the segment portion corresponding to the planned traveling distance of the EV travel which is provided by the SOC (the amount of storage) remaining in the existing battery 6, and structured to notify the vehicle occupant of the existing EV travel enable distance.

The electricity storage control device 10 thus configured enables the travel of the residual traveling enable distance of the desired EV travel even in any circumstances.

Figure 3:
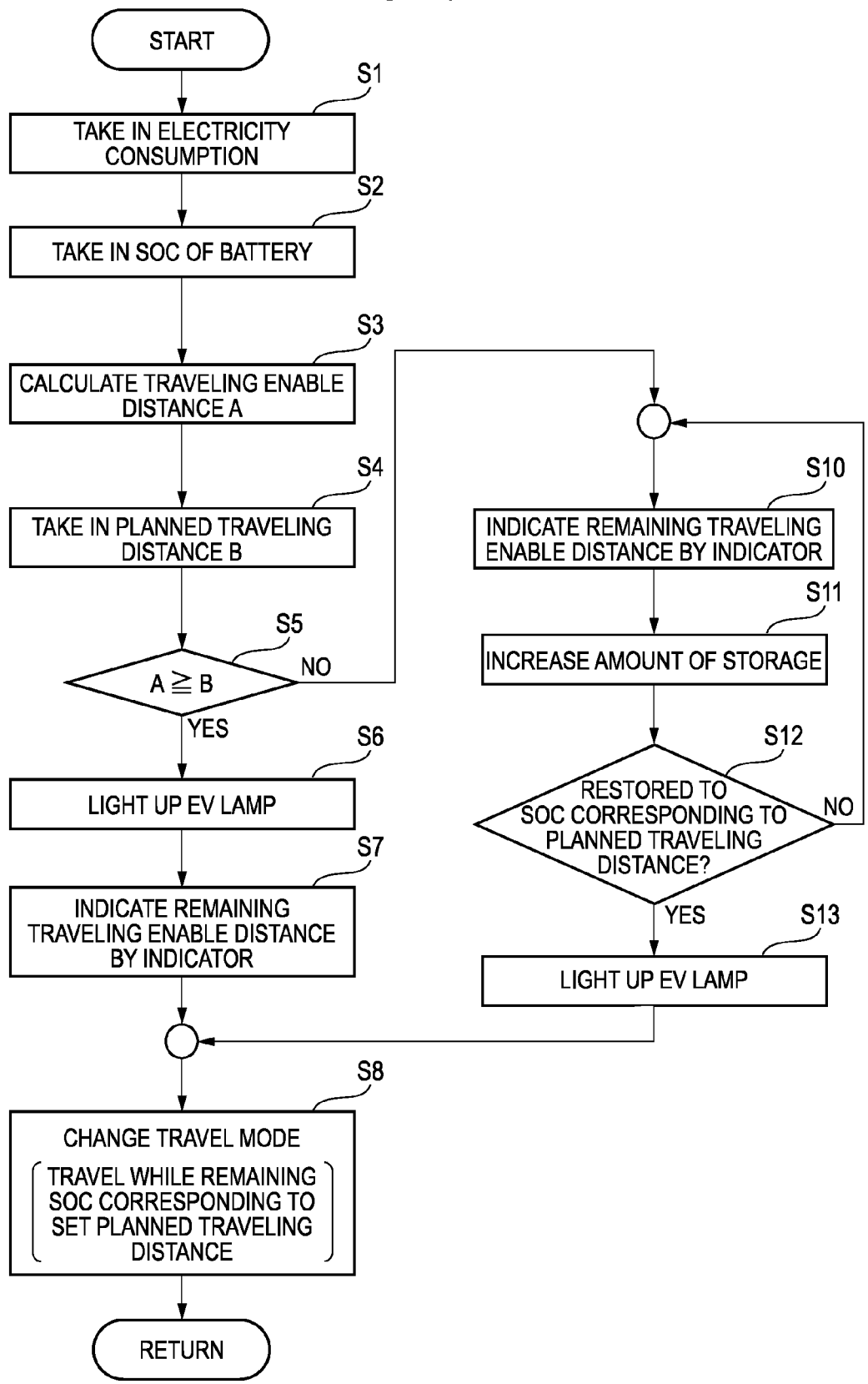
FIG. 3 is a flowchart illustrating a control flow of the electricity storage control device.

The above operation will be described with reference to a control flow of FIG. 3.

The electricity storage control device 10 operates during running of the hybrid vehicle, and, as shown in Step S1, first takes in the electricity consumption computed by the electricity consumption computation unit 16 on the basis of the travel output history and the travel distance history. Subsequently, as shown in Step S2, the electricity storage control device 10 takes in the existing SOC value of the battery 6 from the SOC computation unit 15. In subsequent Step S3, the electricity storage control device 10 computes the traveling enable distance A of the EV travel according to the taken electricity consumption and SOC value.

It is assumed that, for example, the vehicle occupant is planned to arrive at an area close to home in the middle of the night during vehicle travel, and needs to give consideration to suppression of a noise influence when passing through the residential area close to home.

In this situation, the vehicle occupant assumes, for example, the EV travel of about "30 km" passing through the town (depending on the given information), and sets the dial 12 to "30 km" as illustrated in FIG. 1A.

In subsequent Step S4, the electricity storage control device 10 takes in the planned traveling distance B (30 km) set by the dial 12. In subsequent Step S5, the electricity storage control device 10 compares the traveling enable distance A with the planned traveling distance B. In this situation, if the traveling enable distance A is longer than the planned traveling distance B, the electricity storage control device 10 determines that the planned traveling distance in the set EV travel is executable, and advances to Step S6, and lights up the EV lamp 18. Then, the electricity storage control device 10 notifies the vehicle occupant that preparations for the set EV travel are completed, and makes the EV switch 8 effective. Further, in subsequent Step S7, the electricity storage control device 10 indicates the remaining traveling enable distance calculated according to the SOC remaining in the battery 6 by the indicator 13, and advances to Step S8. In Step S8, the electricity storage control device 10 changes the mode to the travel mode in which the hybrid vehicle travels while the SOC corresponding to the planned traveling distance B set by the dial 12 is allowed to remain (mode change). Subsequently, while the SOC is allowed to remain, the EV mode or the HV mode is appropriately executed according to the driving state.

On the other hand, if it is determined that the traveling enable distance A falls below the planned traveling distance B even at one point, the electricity storage control device 10 advances to Step S10, and indicates the remaining traveling enable distance calculated by the SOC remaining in the battery 6 by the indicator 13. In subsequent Step S11, the electricity storage control device 10 drives (generates electricity) the motor/generator 4 by the engine 5 for a difference between those distances by an increased target electricity generation so as to ensure the amount of storage corresponding to the set planned traveling distance B, and charges the battery 6 to increase the amount of storage in the battery 6. In subsequent Step S12, the electricity storage control device 10 continues to charge the battery 6 until the charge is recovered up to the SOC corresponding to the planned traveling distance B. The indication by the indicator in FIG. 1A represents the way in which the traveling enable distance of the battery 6 is gradually increasing by charging.

After the SOC has been recovered, the electricity storage control device 10 advances to Step S13, lights up the EV lamp 18, and notifies the vehicle occupant that the preparations for the set EV travel are completed, makes the EV switch 8 effective, and reaches Step S8. With the above operation, like the above description, the mode change is implemented. Subsequently, the EV mode or the HV mode corresponding to the driving state is executed under the circumstance in which the SOC corresponding to the planned traveling distance B remains.

With the above remaining control of the battery 6, in the hybrid vehicle, a performance for traveling the set planned traveling distance in the EV travel continues to remain during travel.

When the hybrid vehicle enters an area close to home where attention is paid to the noise, the vehicle occupant operates (depresses) the EV switch 8. Then, from this time point, the EV travel in the EV mode is executed (forcedly).

In this situation, since the battery 6 already continues to keep the SOC for traveling the planned traveling distance to be traveled in the EV mode, the hybrid vehicle can arrive home in the silent EV travel through the area where attention is paid to the noise.

Even when the hybrid vehicle put into a garage the previous day leaves the residential area early morning, if the planned traveling distance is set by the dial 12 by predicting this case, this control can deal with the travel early in the morning where attention is paid to noise.

As described above, with the auxiliary fuel tank function for enabling the EV travel of the set planned traveling distance to be executed, the hybrid vehicle enables the EV travel of the desired traveling enable distance even in any circumstances. Even if the planned traveling distance in the set EV mode is longer than the traveling enable distance obtained from the battery 6, the battery 6 is charged up to the amount of storage necessary for the planned traveling distance. Therefore, the preliminary fuel tank function is performed so that the desired planned traveling distance can be ensured. For that reason, this function is effective in delivery vehicles that frequently travel the residential area partially in the middle of the night or early morning.

Moreover, the EV lamp 18 can notify the vehicle occupant that the EV travel is enabled so that the vehicle occupant can recognize this fact rapidly. In particular, since the EV lamp 18 visually notifies the vehicle occupant that the amount of storage is ensured, by lighting of the light source, the EV lamp 18 is easily recognizable. In addition, when the EV travel is enabled, the EV switch 8 becomes effective. Therefore, after the mode forcedly switches to the EV mode through the EV switch 8, travel in the area or location where attention is paid to the noise, such as an area close to home in the middle of the night, the residential area in the middle of the night, or the residential area early morning, can be completed in the silent EV travel surely intended by the vehicle occupant. Thus, the vehicle occupant can prevent the surroundings from being troubled by noise.

In particular, since the traveling enable distance is calculated taking the past electricity consumption into consideration, the planned traveling distance in the travel of the EV mode can be accurately set, and the EV travel intended by the vehicle occupant can be accurately realized.

Also, the indication by the indicator enables how long the EV travel is enabled by the present battery 6 to be determined, and is referred to in setting the planned traveling distance.

The present invention is not limited to the above-mentioned embodiments, but may be variously modified and implemented without departing from the subject matter of the present invention. For example, in the above embodiment, the control for charging is applied immediately after the set planned traveling distance is short. However, the present invention is not limited to this configuration. When the normal HV mode functions, the target electricity generation may increase and conduct charging. A charging time is not limited. Also, annunciation using the EV lamp may be replaced with sound annunciation.

In the above embodiment, the planned traveling distance B is set by the dial 12. However, the present invention is not limited to this configuration. Another setting means may be provided and the planned traveling distance B may be set by the setting means.

According to an aspect of the invention, the hybrid vehicle enables the EV travel of a desired planed traveling distance even under any circumstances.

Even if the planned traveling distance in the set EV mode is longer than the traveling enable distance obtained from the battery, since the battery is charged up to the amount of storage necessary for the planed traveling distance, the planed traveling distance in the desired EV mode can be ensured, and an auxiliary fuel tank function is sufficiently performed.

According to an aspect of the invention, since the annunciation unit informs the vehicle occupant of a fact that the desired EV travel can be conducted, the vehicle occupant can rapidly recognize this fact. Moreover, the EV switch becomes effective, and the mode can be forcedly changed to the EV mode by operating the EV switch. Therefore, travel in an area or location where the vehicle occupant is careful about noise, such as an area close to home in the middle of the night, the residential area in the middle of the night, or the residential area early morning, can be surely performed by only the silent EV travel intended by the vehicle occupant. Thus, the vehicle occupant can prevent the surroundings from being troubled by noise.

According to an aspect of the invention, the planned traveling distance in the EV mode can be precisely set by further taking a unit electric energy (electricity consumption) consumed per unit travel distance into consideration, and the EV travel intended by the vehicle occupant can be accurately realized.

According to an aspect of the invention, that the amount of storage that satisfies the planed traveling distance in the EV mode is ensured can be visually notified the vehicle occupant by a lighting light source.

According to an aspect of the invention, how long the EV travel can be conducted by only the existing battery can be notified to the vehicle occupant by the indication of the indicator, which can be referred to when the planed traveling distance is set.

What is claimed is:

1. An electricity storage control device for a hybrid vehicle, the hybrid vehicle including: an internal combustion engine; a battery that is charged by a power generator driven by the internal combustion engine; and a motor that is driven upon receiving an electric power from the battery, the hybrid vehicle conducting travel in an EV mode for traveling with only the motor, the electricity storage control device comprising:

a planned traveling distance setting unit that sets a planned traveling distance in the EV mode in advance;

an EV switch that sets a travel mode of the hybrid vehicle to the EV mode by operation of a vehicle occupant;

a residual control unit that:
   calculates a traveling enable distance in the EV mode according to an electricity storage state of the battery and that,
   when the planned traveling distance is longer than the traveling enable distance, operates the internal combustion engine to cause the power generator to charge the battery so that amount of storage in the battery reaches amount of storage corresponding to the planned traveling distance, and
   after the amount of storage corresponding to the planned traveling distance is ensured in the battery, makes the EV switch effective; and an annunciation unit that, while the EV switch is effective, notifies the vehicle occupant that the amount of storage corresponding to the planned traveling distance is ensured in the battery, wherein the residual control unit calculates a unit electric energy consumed per a unit travel distance in the travel in the EV mode and calculates the traveling enable distance according to the electricity storage state of the battery based on at least one of the history of past travel output and the history of a travel distance in the EV mode.

2. The electricity storage control device according to claim 1,
   wherein the annunciation unit includes a light source that lights up when the amount of storage corresponding to the planned traveling distance is ensured in the battery.

3. The electricity storage control device according to claim 1, further comprising:
   an indicator that indicates the traveling enable distance calculated by the residual control unit.

4. The electricity storage control device according to claim 1, wherein
   while the EV switch is effective, the residual control unit continues to control such that amount of storage for traveling the planned traveling distance set by the planned traveling distance setting unit in the EV mode remains in the battery.

5. The electricity storage control device according to claim 1, wherein
   when the planned traveling distance is longer than the traveling enable distance, the residual control unit operates the internal combustion engine to drive the power generator, with a target electricity generation which is increased by an amount corresponding to the difference obtained by subtracting the traveling enable distance from the planned traveling distance, to charge the batter so that amount of storage in the battery reaches amount of storage corresponding to the planned traveling distance.

* * * * *